(12) United States Patent
Weissman et al.

(10) Patent No.: US 6,624,935 B2
(45) Date of Patent: Sep. 23, 2003

(54) SINGLE-AXIS STEREOSCOPIC VIDEO IMAGING SYSTEM WITH CENTERING CAPABILITY

(75) Inventors: Michael Weissman, Santa Barbara, CA (US); David Chatenever, Santa Barbara, CA (US); Thomas J. Anhalt, Goleta, CA (US); Daniel Mattsson-Boze, Sacramento, CA (US)

(73) Assignee: Karl Store Imaging, Inc., Goleta, CA (US)

( * ) Notice: Subject to any disclaimer, the term of this patent is extended or adjusted under 35 U.S.C. 154(b) by 0 days.

(21) Appl. No.: 09/821,266

(22) Filed: Mar. 29, 2001

(65) Prior Publication Data

US 2002/0141057 A1 Oct. 3, 2002

Related U.S. Application Data

(60) Provisional application No. 60/251,604, filed on Dec. 6, 2000.

(51) Int. Cl.[7] .................. G02B 27/22; G02B 27/26; H04N 13/00
(52) U.S. Cl. .................. 359/464; 359/462; 359/465; 348/49; 348/56; 348/57
(58) Field of Search ................. 359/462, 464, 359/465; 348/45, 49, 56, 57; 600/111

(56) References Cited

U.S. PATENT DOCUMENTS

| | | |
|---|---|---|
| 5,222,477 A | 6/1993 | Lia |
| 5,471,237 A | 11/1995 | Shipp |
| 5,701,912 A | 12/1997 | Greening et al. ............ 128/773 |
| 5,720,706 A * | 2/1998 | Takahashi et al. .......... 600/111 |
| 5,828,487 A | 10/1998 | Greening et al. ............ 359/466 |
| 5,914,810 A | 6/1999 | Watts |
| 5,964,696 A | 10/1999 | Mihalca |
| 6,151,164 A | 11/2000 | Greening et al. ............ 359/466 |
| 6,275,335 B1 | 8/2001 | Costales ...................... 359/464 |

FOREIGN PATENT DOCUMENTS

| | | |
|---|---|---|
| CA | 2 123 077 | 9/2001 |
| WO | WO 97/03378 | 7/1995 |
| WO | WO 95/28662 | 10/1995 |
| WO | WO 01/06282 A1 | 1/2001 |

OTHER PUBLICATIONS

U.S. Patent Application Patent Publication (No. US2001/0040724 A1).
U.S. Patent Application Patent Publication (No. US2001/0043395 A1).

* cited by examiner

*Primary Examiner*—Audrey Chang
(74) *Attorney, Agent, or Firm*—St. Onge Steward Johnston & Reens LLC

(57) ABSTRACT

An imaging system for producing a stereoscopic image of an object is provided. The imaging system includes a camera for receiving an image of the object, a single-axis optical system disposed between the object and the camera, and an image blocking element disposed between the object and the camera. The image blocking element is activatable to alternately produce a left image and a right image, and is adjustable in a direction perpendicular to the optical axis of the optical system such that the image blocking element is capable of being centered on the aperture (i.e., the entrance pupil, exit pupil, or aperture stop) of the optical system.

19 Claims, 3 Drawing Sheets

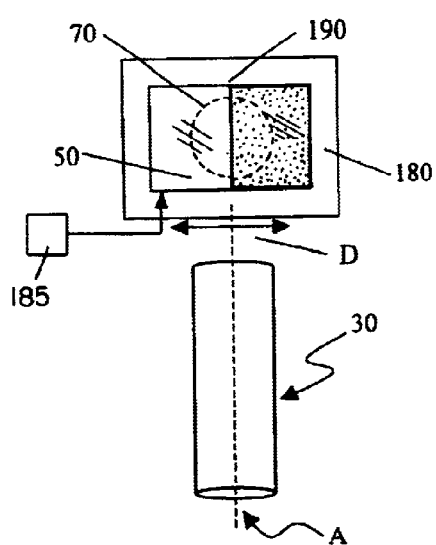
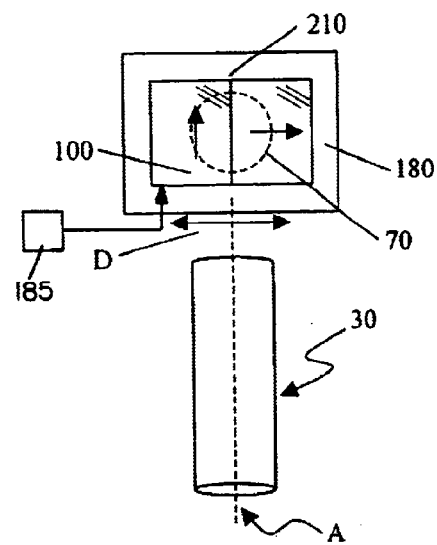
Fig.5　　　　Fig.6
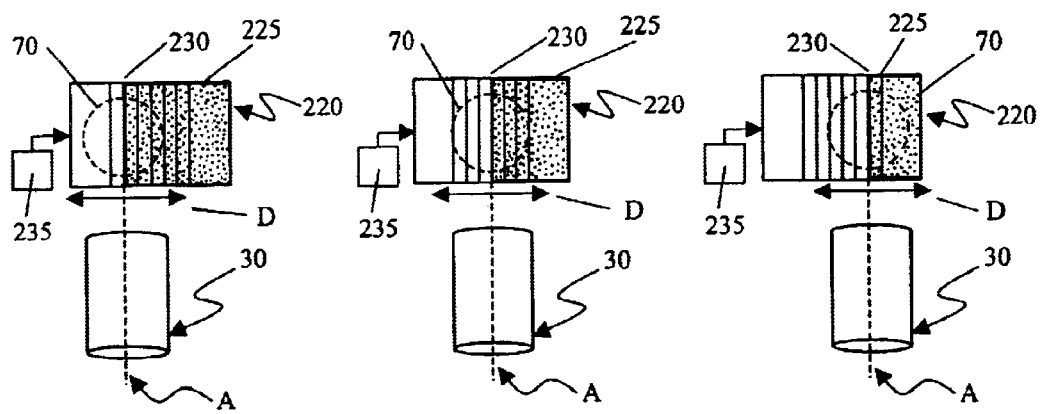
Fig.7a　　　Fig.7b　　　Fig.7c

SINGLE-AXIS STEREOSCOPIC VIDEO IMAGING SYSTEM WITH CENTERING CAPABILITY

RELATED APPLICATIONS

This application claims the benefit of U.S. Provisional Patent Application No. 60/251,604, filed Dec. 6, 2000.

FIELD OF THE INVENTION

The present invention relates to a video imaging system which produces left-eye and right-eye stereo images using a single lens system, and more particularly to such a system which allows for the centering of the left-eye and right-eye views with respect to the lens system in order to produce optimal image quality.

BACKGROUND OF THE INVENTION

Video imaging systems which produce left-eye and right-eye stereo images using a single lens system are well known. Such systems have long been used for a myriad of applications, including in cameras, video or photographic lenses, microscopes, telescopes, endoscopes and borescopes, in order to provide a three-dimensional image of an object of interest, while requiring a single, radially compact lens system. However, although the prior art is highly developed, certain deficiencies in this general area exist.

U.S. Pat. No. 5,222,477 to Lia discloses a stereo imaging and viewing system which employs a miniature camera assembly in which are disposed a CCD imager or equivalent, a wide-angle focusing lens assembly with an effective aperture on the order of about f/2 or wider, and an aperture plate interposed in the optical path of the camera and adjacent the lens assembly. The aperture plate has left and right pupils therein situated on opposite sides of the optic axis of the lens assembly. The pupils are separated from one another by a predetermined pupil distance that is somewhat smaller than the lens diameter. The left image passes through the left pupil and is focused through a corresponding portion of the lens assembly onto the image plane of the imager and a right image passes through the right pupil and is focused by a corresponding portion of the lens assembly onto the image plane of the imager. A selective mechanism, such as alternate shutters or distinct color filters, separates the left and right views of the target sequentially. Left and right views are then presented to a display device for viewing the left and right views stereoscopically.

U.S. Pat. No. 5,471,237 to Shipp discloses a stereoscopic video camera system which includes a single objective lens system mounted at the distal end of a surgical endoscope. An electronic shutter is disposed within the optical path between the lens and a video camera/sensor. The shutter has left and right optical zones which are switched between opaque and light transmissive states in response to a drive signal which is synchronized both with the camera/sensor and with stereoscopic viewing glasses having switchable left and right viewing lenses.

U.S. Pat. No. 5,828,487 to Greening discloses a stereoscopic viewing system which includes, an opaque leaf positioned between the two dimensional lens system and a camera in a single image path. The opaque leaf is movable laterally in the single image path from a left position to a right position to provide a left image perspective and a right image perspective of the image path to the camera. A switching device moves the opaque leaf between the two positions and retains the leaf stationary in each position for a sufficient time for the camera to view each image perspective. A synchronizing system alternates the left image perspective and the right image perspective from the imaging system with a stereoscopic viewing device so that a viewer sees only the left image perspective with one eye and only the right image perspective with the other eye.

U.S. Pat. No. 5,914,810 to Watts discloses a stereoscopic imaging arrangement which includes an optical device having an objective lens and a distal lens located remotely from, but in the optical path of, the objective lens, and a stereoscopic imaging device arranged to receive light from the distal lens and form an image on a photosensitive image plane. The stereoscopic imaging device includes shutter means arranged to selectively occlude light exiting from left and right regions of the distal lens to form right and left images on the image plane. The device also includes means for combining the right and left images to form a stereoscopic representation of the field of view of the distal lens. The image may be displayed on a monitor and viewed stereoscopically with switching spectacles.

U.S. Pat. No. 5,964,696 to Mihalca discloses a stereoscopic imaging device which attaches; to an instrument, such as an endoscope or a borescope, which is characterized by an exit pupil in the vicinity of its proximal region. The imaging device includes a dual aperture plate and an optical switch that are disposed within a housing that attaches to the proximal region of the instrument. The dual aperture plate defines right and left spaced-apart apertures respectively disposed at symmetric locations substantially in the plane of the exit pupil of the instrument. The optical switch alternately blocks light received from the instrument and passing through the right and left optical channels so that a stereoscopic view can be generated.

While each of the above-referenced prior art patents discloses a system which produces left-eye and right-eye stereo images using a single lens system, all of the prior art systems suffer from at least one common disadvantage. In any stereoscopic system, the presentation of balanced left-eye and right-eye images to viewers is critical to prevent viewer eyestrain. That is, the two images must precisely match in clarity, sharpness, color, brightness, etc. In order to accomplish this in single-axis stereoscopic cameras, the device that separates the light rays into left-eye and right-eye images must be precisely centered on the optical axis of the lens system. This causes a number of problems in known designs.

In designs such as those disclosed in U.S. Pat. No. 5,222,477 to Lia, U.S. Pat. No. 5,471,237 to Shipp, U.S. Pat. No. 5,828,487 to Greening, and U.S. Pat. No. 5,914,810 to Watts in which the device that separates the light rays into left-eye and right-eye images is incorporated into the instrument (e.g., the endoscope) itself, precisely centering the image separating device on the optical axis of the lens system requires exacting manufacturing standards and precise tolerances, which are both costly and difficult to achieve. Moreover, even if such a precise centering is achieved during manufacture, repeated use and repeated sterilization of the device may quickly cause the components of the system to shift, bend, expand, contract or the like, even the slight occurrence of which will likely cause the image separating device to no longer be precisely centered on the optical axis of the lens system, which in turn will cause the image produced by the system to degrade.

With respect to designs such as those disclosed in U.S. Pat. No. 5,964,696 to Mihalca in which the device that separates the light rays into left-eye and right-eye images is incorporated in a stereoscopic imaging system which attaches to an instrument (e.g., endoscope), the above-described problems are exacerbated. In addition to the problems associated with the requirement of exacting manufacturing standards and precise tolerances and the problems caused by repeated use, such systems also suffer from the disadvantage of requiring the user (typically a doctor in the case of an endoscope) to precisely align the instrument (which includes the lens system) with the stereoscopic imaging system (which includes the image separating device) in order to precisely center the image separating device on the optical axis of the lens system. Such may be extremely difficult, if not impossible, for the user to achieve. Moreover, such prior art designs cannot be used with instruments having variable aperture positions, as there is no way to center the image separating device on the optical axis of the lens system.

What is desired, therefore, is a stereoscopic imaging system which produces left-eye and right-eye stereo images using a single lens system, which does not require exacting manufacturing standards and precise tolerances, which can accommodate shifting, bending, expanding, contracting or the like of system components without degradation of image quality, which does not require the user to precisely align the instrument with the stereoscopic imaging system, and which can be used with instruments having variable aperture positions.

SUMMARY OF THE INVENTION

Accordingly, it is an object of the present invention to provide a stereoscopic imaging system which produces left-eye and right-eye stereo images using a single lens system.

Another object of the present invention is to provide a stereoscopic imaging system having the above characteristics and which does not require exacting manufacturing standards and precise tolerances.

A further object of the present invention is to provide a stereoscopic imaging system having the above characteristics and which can accommodate shifting, bending, expanding, contracting or the like of system components without degradation of image quality.

Still another object of the present invention is to provide a stereoscopic imaging system having the above characteristics and which does not require the user to precisely align the instrument with the stereoscopic imaging system.

Yet a further object of the present invention is to provide a stereoscopic imaging system having the above characteristics and which can be used with instruments having variable aperture positions.

These and other objects of the present invention are achieved by provision of an imaging system for producing a stereoscopic image of an object having a camera for receiving an image of the object, a single-axis optical system disposed between the object and the camera, and an image blocking element disposed between the object and the camera. The image blocking element is activatable to alternately produce a left image and a right image, and is adjustable in a direction perpendicular to the optical axis of the optical system such that the image blocking element is capable of being centered on the optical axis of the optical system.

In one embodiment, the imaging system includes a housing for receiving the image blocking element, and the image blocking element is movable within the housing in a direction perpendicular to the optical axis of the optical system in order to provide adjustment of the image blocking element. When such is the case, the image blocking element preferably comprises a left half and a right half which define a juncture therebetween, and the image blocking element is centered on the optical axis of the optical system when the juncture is aligned therewith.

This embodiment of the invention is particularly useful in several cases. For example, where the image blocking element comprises a liquid crystal shutter to alternately block light transmission through the left half and the right half thereof, or where the image blocking element comprises a polarizer element having two halves of different polarization states. In the latter case, a polarization selector is further included to modify the polarization angle of transmitted light, and the polarizer element and the polarization selector act to alternately blocks light transmission through the left half and the right half of the polarizer element.

In another embodiment, the image blocking element may comprise a liquid-crystal device having a plurality of segments arrayed left to right, each segment switchable as a shutter passing or blocking the transmission of light according to the application of electronic signals. In this case, the imaging system further includes a controller for applying electronic signals to the segments such that a contiguous group of the segments are switched in unison in order to produce a left image and the remainder of the segments are switched in unison in order to produce a right image. The group of segments producing the left image and the group of segments producing the right image define a juncture therebetween. The number of segments switched in order to produce the left image and the corresponding number of segments switched in order to produce the right image is variable such that the liquid crystal device is adjustable in a direction perpendicular to the optical axis of the optical system so that the liquid crystal device is capable of being centered thereon. The liquid crystal device is centered on the optical axis of the optical system when the juncture is aligned therewith.

In this second embodiment, the segments of the liquid crystal device preferably comprise rectangular segments.

In both embodiments it is preferable that the left image and the right image are viewable by a user, and that the image blocking element is adjustable by the user while the user is viewing the images.

The invention and its particular features and advantages will become more apparent from the following detailed description considered with reference to the accompanying drawings.

BRIEF DESCRIPTION OF THE DRAWINGS

FIG. 5 is a schematic view of a stereoscopic imaging system in accordance with the present invention employing a mechanical centering mechanism to center a liquid-crystal device used as an electronic shutter;

FIG. 6 is a schematic view of a stereoscopic imaging system in accordance with the present invention employing a mechanical centering mechanism to center a liquid-crystal polarization device used as a polarization selector; and FIGS. 7a–7c are schematic views of a stereoscopic imaging system in accordance with the present invention employing an electronic liquid-crystal shutter having multiple segments in order to provide centering of the shutter.

DETAILED DESCRIPTION OF THE INVENTION

Figure 1:
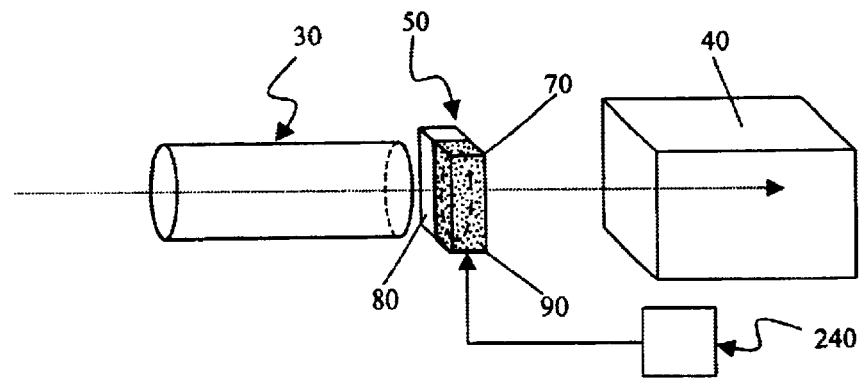
FIG. 1 is a schematic view of a standard stereoscopic imaging system employing a liquid-crystal device as an electronic shutter.
Figure 2:
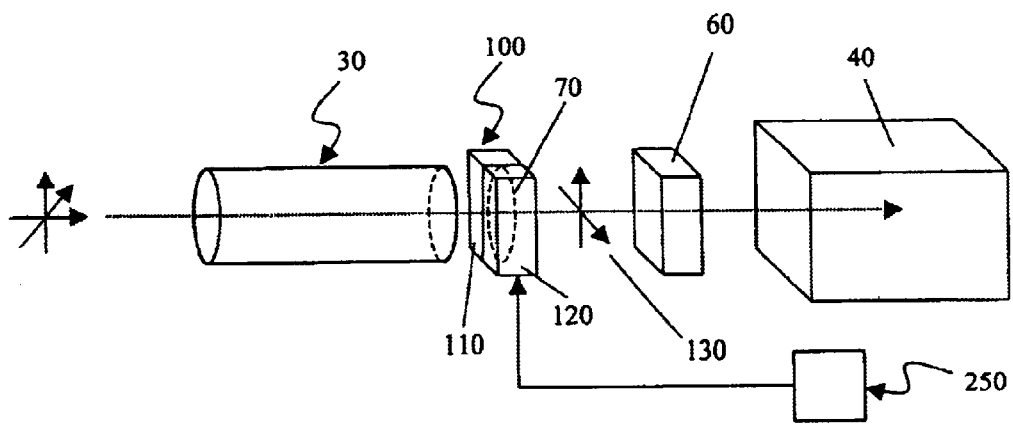
FIG. 2 is a schematic view of a standard stereoscopic imaging system employing a liquid-crystal device as a polarization selector.

Referring first to FIGS. 1 and 2, the present invention utilizes a liquid-crystal device to produce stereoscopic images via a single-axis optical system (30) such as a video or photographic lens, microscope, telescope, or endoscope. The stereoscopic images are then detected via a single or multiple-sensor imaging device (40). The liquid-crystal device is either an electronic shutter (50) which blocks the transmission of light, or a polarization selector (60) which selects the polarization angle of transmitted light.

FIG. 1 depicts the first situation, which utilizes the liquid-crystal device as an electronic shutter (50). The electronic shutter can be configured as separate shutters or as a single multi-part device. When controlled by an appropriate electronic signal (240), the electronic shutter alternately blocks light transmission through each side of an appropriate aperture of the optical system. The preferred placement of the electronic shutter is at the aperture stop, entrance pupil, or the exit pupil of the optical system, collectively referred to hereinafter as the "aperture." FIG. 1 depicts the placement of the electronic shutter at the exit pupil (70) of the single-axis optical system. The alternating blockage of light transmission through the aperture produces two separate images, left-eye and right-eye, on a real-time basis. The left-eye image is generated when the left side of the electronic shutter (80), or right side depending upon the optical system design, blocks light transmission, and the right-eye image is generated when the opposite side of the shutter (90) blocks light transmission.

FIG. 2 depicts the second situation, which utilizes the liquid-crystal device as a polarization selector (60) to modify the polarization angle of transmitted light, in accordance with appropriate electronic signals (250). A polarizer element (100), having two halves of different polarization states (110 and 120), is placed at the optical system aperture (70) in order to encode light transmission through each side of the aperture with orthogonal polarization (130).

Figure 3:
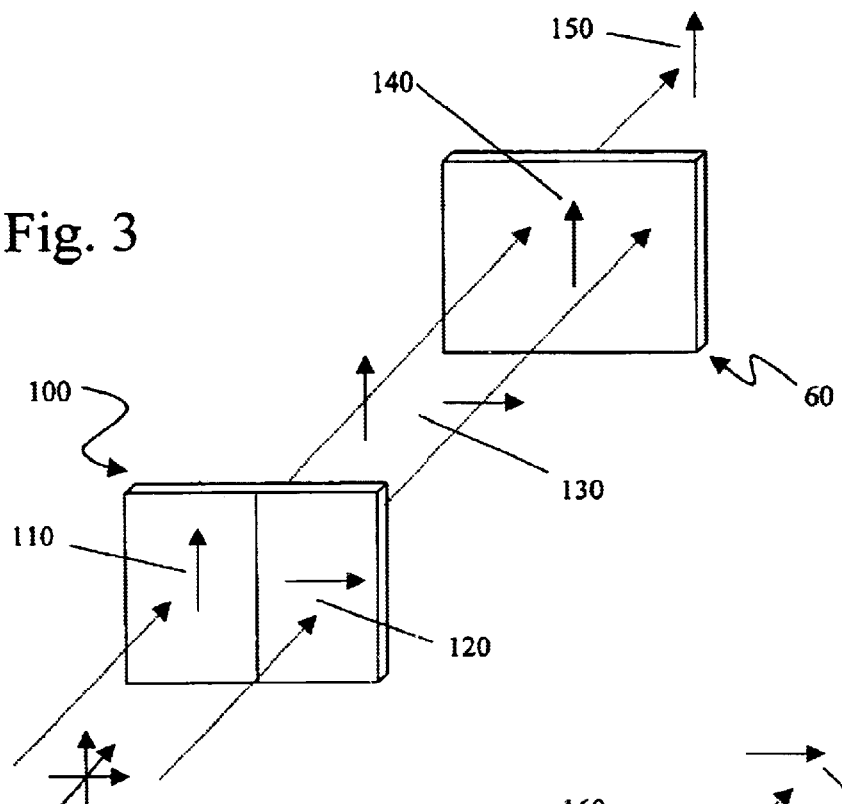
FIGS. 3 and 4 are schematic views illustrating operation of the liquid-crystal polarization device of FIG. 2.
Figure 4:
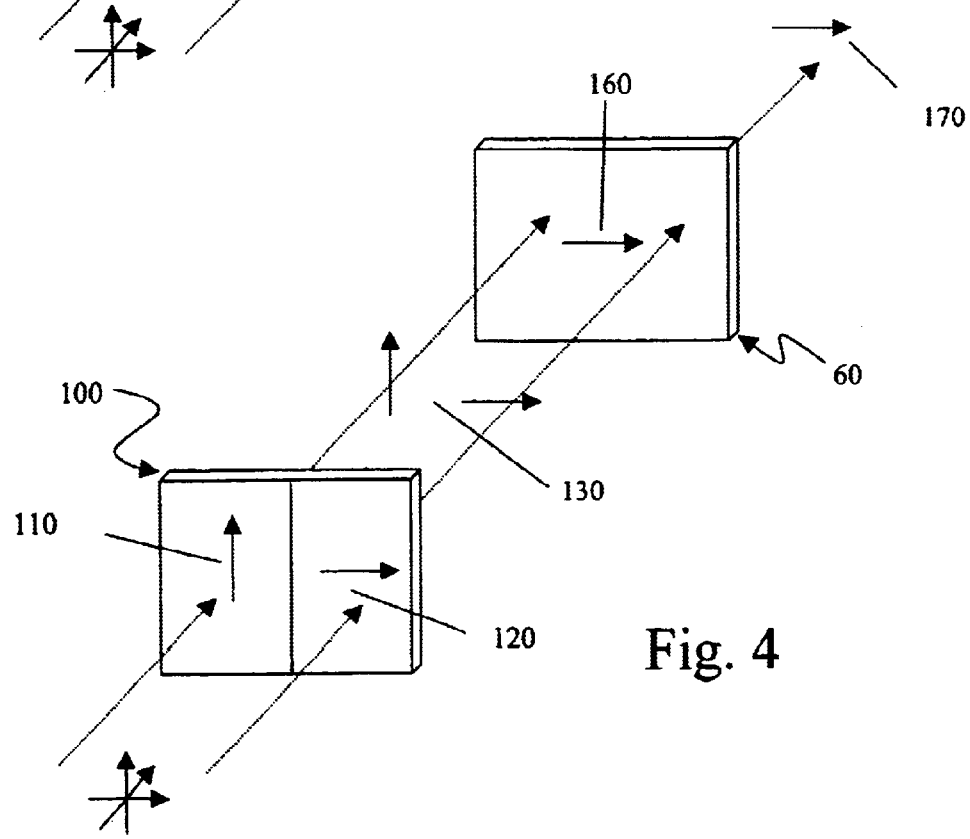

FIG. 3 depicts the initial state of the polarization selector. When an appropriate electronic signal (250) is applied to the selector, the acceptance angle of the polarized light is oriented (140) in such a way that the light from only one side of the aperture (70) is able to pass through (150). FIG. 4 depicts the opposite state of the selector. The appropriate electronic signal (250) is changed in such a way that the polarization acceptance angle is now orthogonal to the original acceptance angle (160). This allows only the light from the opposite side of the aperture (70) to pass through (170).

Thus, utilizing the liquid-crystal device as an electronic shutter or as a polarization selector, the sequential timing of the appropriate electronic signal is synchronized with alternate fields of a video system, having either an interlaced or non-interlaced scanning format. When one video field is active, light from the corresponding left or right side of the aperture produces a left or right image in accordance with the synchronized electrical signal controlling the liquid-crystal device. Thus, the video signal from the imaging device (40) is of standard format, except the alternate fields contain first the left, then the right image.

As discussed above, in any stereoscopic system, the presentation of balanced left-eye and right-eye images to viewers is critical to prevent viewer eyestrain. That is, the two images must precisely match in clarity, sharpness, color, brightness, etc. In order to accomplish this in single-axis stereoscopic cameras, the device that separates the light rays into left-eye and right-eye images must be precisely centered on the aperture of the lens system.

Thus, when a liquid-crystal device is used as an electronic shutter (50), as is illustrated in FIG. 5, the aperture (70) of the optical system (30) must be aligned precisely with the juncture (190) of the left and right sides of the electronic shutter (50). Similarly, what this means when a liquid-crystal device is used as a polarization selector, as is shown in FIG. 6, is that the aperture (70) of optical system (30) must be aligned precisely with orthogonal polarization juncture (210) of the polarizer (100).

In either case, this alignment may be achieved mechanically by disposing the electronic shutter (50) or the polarizer (100) in a housing (180) such that the electronic shutter (50) or the polarizer (100) is displaceable (indicated by arrow D) within the housing (180) along an axis perpendicular to the optical axis (A) of optical system (30).

In order for electronic shutter (50) or polarizer (100) to be mechanically aligned, any of a number of mechanisms (185) may be provided. For example, a set of gears, screws, racks and pinions, or the like may be provided to displace the electronic shutter (50) or polarizer (100) along its path of movement to achieve precise centering thereof. Such mechanisms (185) may be operated manually by a user or by motors which are controlled by a user. However, it should be noted that it is preferable that the centering mechanism (185) be under the control of the camera user such that the balancing of the two images can be optimized while the images are being viewed by the user.

Referring now to FIGS. 7a–7c, another embodiment of the present invention is shown. In this embodiment an electronic liquid-crystal device (220) having multiple segments (225), is employed. Each segment of the device acts as a shutter passing or blocking the transmission of light according to the application of appropriate electronic signals, much like the electronic shutter (50) described above with respect to FIGS. 1 and 5. Segments (225) may be rectangular and arranged vertically, as shown in the FIGS., or may be of any of other appropriate shapes, such as square, hexagonal, or the like. The appropriate electronic signals are provided by a controller (235).

Multiple contiguous segments (225) of the device (220) are switched in unison by controller (235) in order to produce two separate images, left-eye and right-eye, in a shuttering action that has a variable center position or juncture (230). An illustrative example follows. As depicted in FIG. 7a, if the position of the aperture of the optical system (30) is to the left, centering of light rays that make up the two images is accomplished by switching the two left segments (225) in unison, and the six right segments in unison. In FIG. 7b, aperture of the optical system (30) is centered on the device and an equal number of segments (225) are switched in unison. In FIG. 7c, the aperture of the optical system (30) is to the right, in which case the six segments (225) on the left side are switched in unison, and the two on the right are switched in unison. Thus, the juncture (230) of the left and right sides of the electronic shutter (220), which is comprised of segments (225), is displaceable (indicated by arrow D) along an axis perpendicular to the juncture (230).

The present invention, therefore, provides a stereoscopic imaging system which produces left-eye and right-eye stereo images using a single lens system, which does not require exacting manufacturing standards and precise tolerances, which can accommodate shifting, bending, expanding, contracting or the like of system components without degradation of image quality, which does not require the user to precisely align the instrument with the stereoscopic imaging system, and which can be used with instruments having variable aperture positions.

Although the invention has been described with reference to a particular arrangement of parts, features and the like, these are not intended to exhaust all possible arrangements or features, and indeed many other modifications and variations will be ascertainable to those of skill in the art.

What is claimed is:

1. An imaging system for producing a stereoscopic image of an object, said imaging system comprising:
    a camera for receiving an image of the object;
    an optical system disposed between the object and said camera, said optical system having a single optical axis and an aperture;
    an image blocking element disposed between the object and said camera, said image blocking element being activatable to alternately allow a left image and a right image to pass therethrough, said image blocking element having a right half and a left half which define a juncture therebetween; and
    wherein said image blocking element is adjustable during use of the imaging system and while viewing the stereoscopic image of the object in a direction perpendicular to the optical axis of said optical system such that the juncture of said image blocking element is adjustable with respect to the optical axis of said optical system so as to provide a mechanism for correcting misalignment of the juncture of said image blocking element with respect to the optical axis of said optical system during use of the imaging system.

2. The imaging system of claim 1 further comprising a housing for receiving said image blocking element, and wherein said image blocking element is mechanically movable within the housing in a direction perpendicular to the optical axis of said optical system in order to provide adjustment of the image blocking element.

3. The imaging system of claim 2 wherein said image blocking element comprises a liquid crystal shutter to alternately block light transmission through the left half and the right half thereof.

4. The imaging system of claim 2 wherein said image blocking element comprises a polarizer element having two halves of different polarization states, wherein said imaging system further comprises a polarization selector to modify the polarization angle of transmitted light, and wherein the polarizer element and the polarization selector act to alternately block light transmission through the left half and the right half of the polarizer element.

5. The imaging system of claim 1 wherein said image blocking element comprises a left half and a right half, the left half and the right half of said image blocking element defining a juncture, and wherein said image blocking element is properly positioned within said optical system when the juncture is aligned with the aperture of said optical system.

6. The imaging system of claim 5 wherein said image blocking element comprises a liquid crystal shutter to alternately blocks light transmission through the left half and the right half thereof.

7. The imaging system of claim 5 wherein said image blocking element comprises a polarizer element having two halves of different polarization states, wherein said imaging system further comprises a polarization selector to modify the polarization angle of transmitted light, and wherein the polarizer element and the polarization selector act to alternately block light transmission through the left half and the right half of the polarizer element.

8. The imaging system of claim 1 wherein the left image and the right image are viewable by a user, and wherein said image blocking element is adjustable by the user while the user is viewing the images.

9. The imaging system of claim 1:
    wherein said image blocking element comprises a liquid-crystal device having a plurality of segments arrayed left to right, each segment switchable as a shutter passing or blocking the transmission of light according to the application of electronic signals;
    said imaging system further comprising a controller for applying electronic signals to the segments such that a contiguous group of the segments are switched in unison in order to produce a left image and the remainder of the segments are switched in unison in order to produce a right image, the group of segments producing the left image and the group of segments producing the right image defining a juncture therebetween; and
    wherein the number of segments switched in order to produce the left image and the corresponding number of segments switched in order to produce the right image is variable such that the liquid crystal device is adjustable in a direction perpendicular to the optical axis of said optical system so that the liquid crystal device is capable of being centered on the optical axis of said optical system.

10. The imaging system of claim 9 wherein the liquid crystal device is properly positioned within said optical system when the juncture is aligned with the aperture of said optical system.

11. The imaging system of claim 9 wherein the segments of the liquid crystal device comprise rectangular segments.

12. An imaging system for producing a stereoscopic image of an object, said imaging system comprising:
    a camera for receiving an image of the object;
    an optical system disposed between the object and said camera, said optical system having a single optical axis;
    a housing disposed between the object and said camera;
    an image blocking element disposed within said housing, said image blocking element comprising a left half and a right half, the left half and the right half of said image blocking element defining a juncture, said image blocking element being activatable to alternately allow a left image and a right image to pass therethrough; and
    wherein said image blocking element is mechanically movable within the housing during use of the imaging system and while viewing the stereoscopic image of the object in a direction perpendicular to the optical axis of said optical system such that the juncture defined by the left half and the right half of said image blocking element is aligned with the optical axis of said optical system so as to provide a mechanism for correcting misalignment of the juncture of said image blocking element with respect to the optical axis of said optical system during use of the imaging system.

13. The imaging system of claim 12 wherein said image blocking element comprises a liquid crystal shutter to alternately block light transmission through the left half and the right half thereof.

14. The imaging system of claim 12 wherein said image blocking element comprises a polarizer element having two halves of different polarization states, wherein said imaging system further comprises a polarization selector to modify the polarization angle of transmitted light, and wherein the polarizer element and the polarization selector act to alternately block light transmission through the left half and the right half of the polarizer element.

15. The imaging system of claim 12 wherein the left image and the right image are viewable by a user, and wherein said image blocking element is adjustable by the user while the user is viewing the images.

16. An imaging system for producing a stereoscopic image of an object, said imaging system comprising:
   a camera for receiving an image of the object;
   an optical system disposed between the object and said camera, said optical system having a single optical axis;
   a liquid-crystal device disposed between the object and the camera, said liquid crystal device having a plurality of segments arrayed left to right, each segment switchable as a shutter passing or blocking the transmission of light according to the application of electronic signals;
   a controller for applying electronic signals to the segments such that a contiguous group of the segments are switched in unison in order to allow a left image to pass therethrough and the remainder of the segments are switched in unison in order to allow a right image to pass therethrough, the group of segments allowing the left image to pass therethrough and the group of segments allowing the right image to pass therethrough defining a juncture therebetween; and
   wherein the number of segments switched in order to allow the left image to pass therethrough and the corresponding number of segments switched in order to allow the right image to pass therethrough is variable such that the location of the juncture of the liquid crystal device is adjustable during use of the imaging system and while viewing the stereoscopic image of the object in a direction perpendicular to the optical axis of said optical system so as to provide a mechanism for correcting misalignment of the juncture of said image blocking element with respect to the optical axis of said optical system during use of the imaging system.

17. The imaging system of claim 16 wherein the liquid crystal device is properly positioned within said optical system when the juncture is aligned with the aperture of said optical system.

18. The imaging system of claim 16 wherein the segments of the liquid crystal device comprise rectangular segments.

19. The imaging system of claim 16 wherein the left image and the right image are viewable by a user, and wherein the liquid crystal device is adjustable by the user while the user is viewing the images.

* * * * *

UNITED STATES PATENT AND TRADEMARK OFFICE
CERTIFICATE OF CORRECTION

PATENT NO. : 6,624,935 B2  Page 1 of 1
DATED : September 23, 2003
INVENTOR(S) : Michael Weissman et al.

It is certified that error appears in the above-identified patent and that said Letters Patent is hereby corrected as shown below:

<u>Title page,</u>
Item [73], please correct Assignee to read as -- Karl Storz Imaging, Inc., Goleta, CA (US) --

Signed and Sealed this

Fourth Day of November, 2003

JAMES E. ROGAN
*Director of the United States Patent and Trademark Office*